United States Patent [19]

Yamazaki

[11] Patent Number: 4,540,359
[45] Date of Patent: Sep. 10, 1985

[54] INJECTION MOLDING MACHINE

[75] Inventor: Yoshihiko Yamazaki, Nagano, Japan

[73] Assignee: Nissei Plastics Industrial Co., Ltd., Japan

[21] Appl. No.: 512,135

[22] PCT Filed: Oct. 7, 1982

[86] PCT No.: PCT/JP82/00402

§ 371 Date: Jun. 6, 1983

§ 102(e) Date: Jun. 6, 1983

[87] PCT Pub. No.: WO83/01224

PCT Pub. Date: Apr. 14, 1983

[30] Foreign Application Priority Data

Oct. 8, 1981 [JP] Japan ............... 56-160681
Apr. 15, 1982 [JP] Japan ............... 57-62835
Jun. 30, 1982 [JP] Japan ............... 57-113603

[51] Int. Cl.³ ............................ B28B 17/00
[52] U.S. Cl. .................. 425/135; 425/157; 425/542; 425/547; 425/589; 425/593
[58] Field of Search ........... 425/135, 147, 542, 547, 425/589, 593, 155, 157

[56] References Cited

U.S. PATENT DOCUMENTS 3,632,246 9/1969 Ichikawa et al. ............... 425/135
3,890,308 6/1975 Collins ...................... 425/593
3,930,600 1/1976 Gardner ..................... 425/542

Primary Examiner—Jay H. Woo
Assistant Examiner—Timothy W. Heitbrink
Attorney, Agent, or Firm—Ostrolenk, Faber, Gerb & Soffen

[57] ABSTRACT

An injection molding machine wherein both a clamping mechanism and an injection mechanism are actuated by means of a servo-motor, in which machine, mold opening and closing and clamping on the clamping mechanism side are carried out by gear means provided over a transmission shaft positioned on the clamping mechanism side and a rotary member threadedly engaged with a plunger having threads in the periphery thereof, the operation for advancing and rotating an injection screw on the injection mechanism side is carried out by advancing and rotating means by a rotary shaft and gears provided within a housing and transmission means by a plurality of gears provided together with an electromagnetically-operated clutch member in a portion of said transmission shaft positioned on the injection mechanism side, said machine comprising an electromagnetically-operated clutch mechanism for temporarily stopping the application of a turning force by said servo-motor to the clamping mechanism side, and a force retaining device by an electromagnetically-operated brake capable of retaining the clamping force during the time of said stoppage, a series of steps of mold opening, clamping, injection of molten resin, metering and mold opening being effected by use of the servo-motor.

8 Claims, 12 Drawing Figures

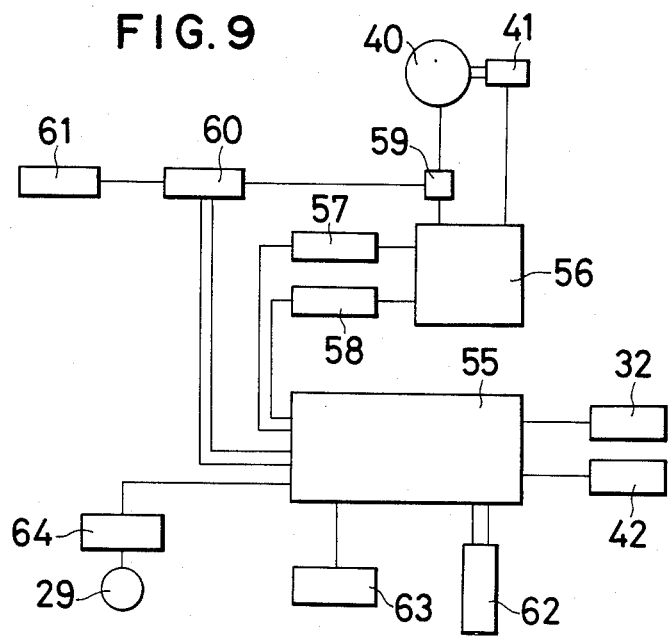
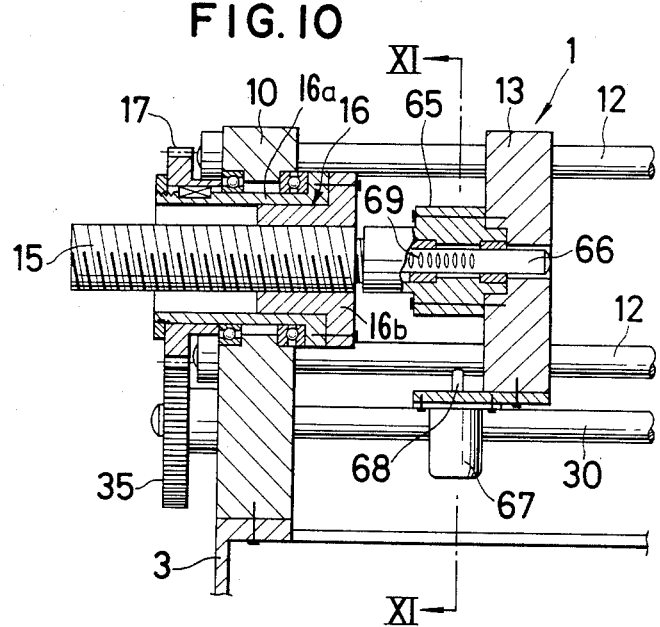

INJECTION MOLDING MACHINE

FIELD OF THE INVENTION

This invention relates to an injection molding machine wherein a clamping mechanism and an injection mechanism are operated by the same electric motor to pour a molten resin on the side of the injection machine into a mold on the side of the clamping mechanism.

BACKGROUND OF THE ART

In general, the injection molding machine uses oil pressure as a driving source. The use of oil pressure involves many problems, and particularly, the instability to the operation of the machine resulting from a change in viscosity of hydraulic oil greatly influences the injection molding of resins. In addition, expensive hydraulic devices, for example, a hydraulic pump, various kinds of hydraulic control valves, a hydraulic cylinder, a hydraulic motor, a heat exchanger, etc. are required, and moreover, management of temperatures and contamination of hydraulic oil, and exchange of hydraulic oil resulting from deterioration are also required.

As one of means for solving the problem raised when oil pressure is used as a driving source as described above, it is considered that the machine is operated by the electric motor. In fact, it has been partly suggested that the electric motor is used in the injection molding machine. However, this is not that the injection molding machine is totally operated by the electric motor but the clamping mechanism is used as means for rotating a screw of the injection mechanism and merely used jointly with oil pressure.

In the injection molding machine, the difficulty involved in the accomplishment of the entire process by the same electric motor lies in the responsiveness of a normal electric motor. Unlike the cutting work of articles, the injection molding includes a speed control region and a force control region in one molding cycle. Accordingly, the injection molding machine cannot be operated by one electric motor unless the electric motor is actuated in response to said regions.

In accordance with this invention, a servo-motor used for machine tools or the like is used to drive the injection molding machine to continuously carry out the processes from the clamping of a mold to the injection of molten resin, thus solving various problems caused by oil pressure in prior arts. Furthermore, it is an object of the present invention to provide a machine wherein a required number of clutches and brakes are used to convert the rotation of the servo-motor into a force, thereby generating a clamping force, an injection force and the like equivalent to those cases where oil pressure is used, and making it possible to achieve injection molding without use of oil pressure.

DISCLOSURE OF THE INVENTION

This invention is designed so that both a clamping mechanism side and an injection mechanism side are operated by means of a single servo-motor. From the servo-motor it is possible to obtain an extremely great torque when it runs at a low speed and can be driven directly without using a reduction gear. Also, the servo-motor has a great torque inertia ratio and has a wide range of varible speed and therefore it is suitable for controlling the injection speed. The feedback control may be employed to achieve stabilization of the injection force and clamping force. With this, power may be saved, the apparatus may be simplified and the machine is excellent economically. Furthermore, hydraulic oil need not be used at all and thus the power transmission efficiency increases as compared with a hydraulic system resulting in power saving as well as extreme readiness in maintenance and management of the machine.

The present invention further provides an arrangement wherein gear means for opening and closing and clamping a mold and gear means for rotating or forwardly moving an injection screw are associated through clutches with a transmission shaft for actuating a servo-motor whereby said clutch is actuated to achieve a series of injection molding processes.

The present invention further comprises a back pressure control device comprising an electromagnetic brake and a force retaining device, whereby making it possible to suitably and precisely control back pressure or retaining pressure without use of oil pressure. Particularly, a hysteresis brake is used only for controlling back pressure. It is the best mode of the present invention to use the hysteresis brake for controlling back pressure. The present invention still further comprises a structure in which the rotation of the servo-motor may be converted into movement of the injection mechanism by the screw shaft, thereby making it possible to continuously achieve a series of steps of clamping, nozzle touching and injection. Threads formed in the circumferences of the screw shaft and plunger of the clamping mechanism are preferably ball threads. Friction produced in a contact portion between the ball on the side of a receiving member fitted in the slot and the threads is in the form of rolling friction because transmission efficiency resulting from meshing between the screw threads is extremely greater than the efficiency of normal threads and loss of forces is small.

The servo-motor used in this invention may be a conventional servo-motor provided with particulars generally used, and also, the electromagnetic clutch, electromagnetic brake, etc. may be of those commercially available, which can be employed without modification.

Moreover, in accordance with the present invention, parts operated by the hydraulic means are operated by mechanical means, and other parts can be totally the same in structure as those of prior arts. The injection molding machines from a small size of injection capacity 5 cm$^3$ to a relatively large size may be prepared depending on the rated output of the servo-motor.

BRIEF DESCRIPTION OF THE DRAWINGS

FIG. 9 is a block diagram of a device for detecting and controlling electric current.

FIG. 10 is a partial longitudinal sectional view of a clamping mechanism showing a knock-out device.

BEST MODE FOR EMBODYING THE INVENTION

The present invention will be better understood from the ensuing detailed description in connection with the accompanying drawings.

Figure 1:
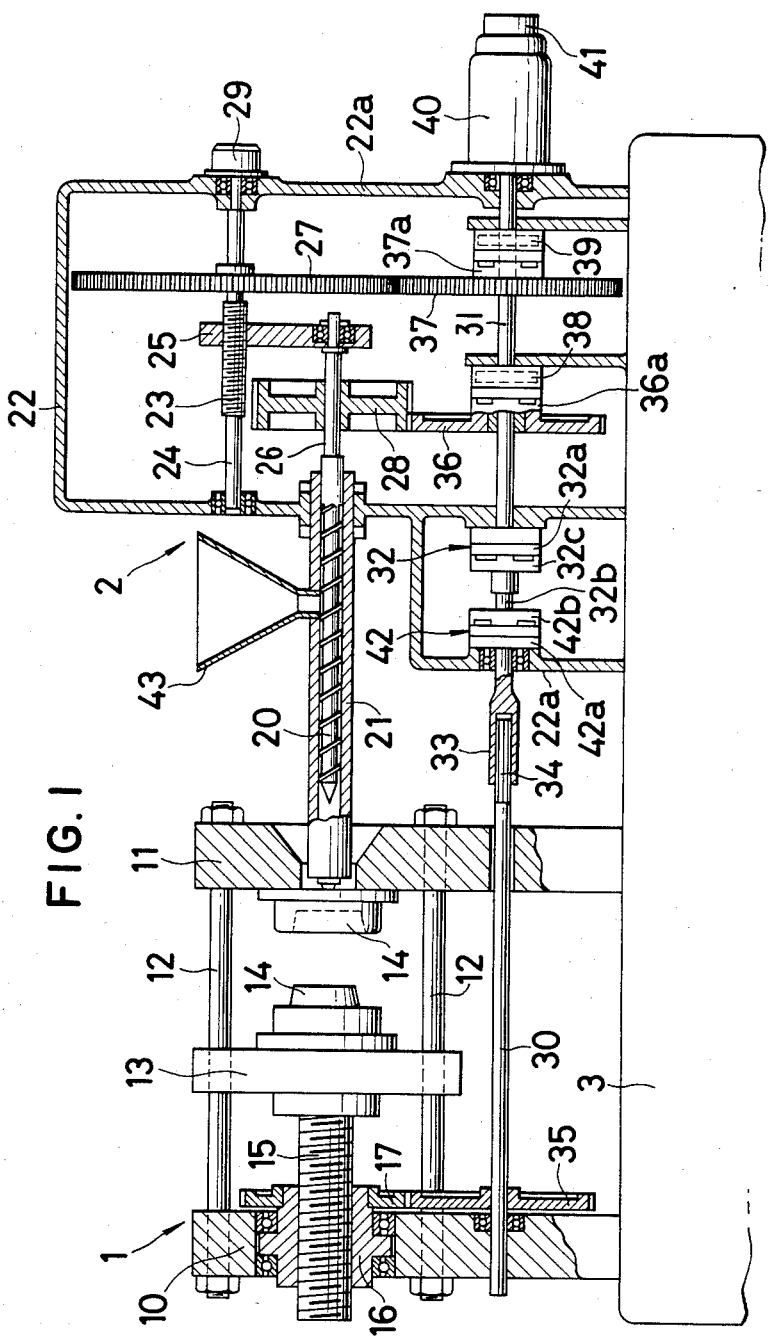
FIG. 1 is a schematic longitudinal sectional view showing a basic construction of an injection molding machine in accordance with the present invention.

FIG. 1 schematically shows a basic construction of an injection molding machine in accordance with the present invention. Reference numeral 1 designates a clamping mechanism and reference numeral 2 designates an injection mechanism. The clamping mechanism 1 comprises a pair of fixed plates 10, 11 provided opposed and spaced apart on a machine bed 3, a required number of tie bars 12, 12 mounted over the fixed plates 10, 11, and a movable plate 13 movably mounted on the tie bars 12, 12. On the opposed surfaces between said one fixed plate 11 and the movable plate 13 are provided molds 14, 14, respectively, and a large diameter plunger 15 which is formed with ball type threads on the side surface thereof is connected to the opposite surface of the movable plate 13. The ball type threads are high in transmission efficiency and small in start friction. This plunger 115 is threaded into a thread receiving portion 16b internally of a rotary plate 16 that is rotatably mounted through a ball bearing on the fixed plate 10 which forms a fixing member and is moved in an axial direction by rotation of the rotary plate 16. The rotary plate 16 has a gear 17 mounted thereon which is meshed with a transmission gear which will be described later.

The injection mechanism 2 comprises an injection heating cylinder 21 accommodating an injection screw 20 therein and a housing 22 on the machine bed 3 also serving to hold the injection heating cylinder 21. Interiorly of the housing 22, a rotary shaft 24 provided with a threaded shaft 23 is laterally mounted, and a movable member 25 is meshed with said threaded shaft 23. At the rear end of the screw 20 is connected, integral with the screw 20, an extended shaft 26 whose end is received in said movable member 25. The rotary shaft 24 and extended shaft 26 have a screw advancing gear 27 and a screw rotating gear 28 positioned so as not to interfere with each other. At the end of the rotary shaft 24 a back pressure control device 29 is mounted by the electromagnetic brake secured to a housing wall 22a.

Within and at the lower region of the housing 22 is provided a transmission shaft 31 that extends parallel to the rotatary shaft 24 and extended shaft 26, said shaft 31 extending through the housing 22. Also, downwardly of the clamping mechanism 1 is provided a transmission shaft 30 parallel to the threaded plunger 15, said transmission shaft 30 extending through the pair of fixed plates 10, 11. Two transmission shafts 30, 31 on the clamping mechanism and injection mechanism sides are associated to be moved toward and away from each other through a clutch mechanism 32.

The clutch mechanism 32 comprises a clutch member 32a secured to the end of the transmission shaft 31, a clutch shaft 32b disposed on an extension of the transmission shaft 31 and rotatably mounted on the housing wall, and a coupling 32c secured to the inner end of the clutch shaft 32b, an exciting portion thereof being secured to the housing side. Mounted on the outer end of the clutch shaft 32b is a joint 33 for connecting the transmission shaft 30. The joint 33 and the transmission shaft 30 are connected by a means 34 such as a spline or key which allows movement in an axial direction so that when the injection mechanism 2 is moved forward to or backward from the clamping mechansim 1, the mutually connected transmission shafts 30 and 31 by the clutch shaft 32b are not impaired in their movement.

The transmission shaft 30 has a transmission gear 35 mounted thereon adjacent the inside of the fixed plate 10, said transmission gear 35 being meshed with the gear 17 of the rotary plate 16, and a turning force of the transmission shaft 30 is transmitted by said transmission gear 35 to the rotary plate 16 so that the threaded shaft 15 in threaded engagement with the rotary plate 16 is axially delivered by the rotation of the rotary plate 16 to move the movable plate 13 in a mold closing or opening direction along the tie bars 12, 12.

Provided on the transmission shaft 31 are transmission gears 36, 37 meshed with the gears 27, 28, and each respectively connectable to shaft 31, through respective clutch members 38, 39. The clutch members 38, 39 comprise a coupling associated with the transmission gears 37, 36 and an exciting portion secured to the housing side, and the transmission gears 36, 37 and transmission shaft 31 are coupled with or released from each other by the function of the clutch plate and exciting portion provided therein.

The portion of the transmission shaft 31 projected outwardly of the housing wall 22a is connected to a servo-motor 40 provided with a tachometer generator 41 secured to the housing wall 22a.

The clutch shaft 32b is provided with a device 42 for retaining the clamping force. This force retaining device 42 is composed of an electromagnetically-operated brake member 42a secured to the housing wall 22a and a coupling 42b mounted on the side of the clutch shaft.

Figure 2:
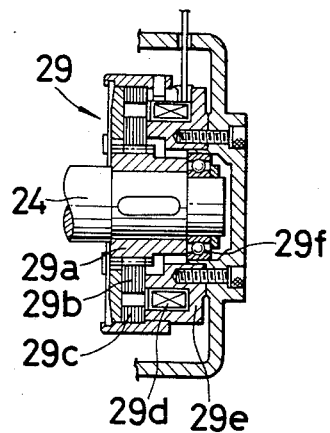
FIG. 2 is a sectional view of a back pressure control device and an electromagnetic brake used as a force retaining device, of the machine in accordance with the present invention.

FIG. 2 shows one example of a brake used as the aforesaid back pressure control device 29 (MWB type Brake, OGURA CLUTCH CO., LTD.). This brake comprises an inner driver 29a keyed to the outer end of a shaft portion 24, an armature 29b, a plurality of brake plates 29c internal and externally separated, and a field core 29e adjacent to the brake plate 29c and accommodating a coil 29d therein, said field core 29e being fitted in said shaft portion 24 by means of a ball bearing and secured to a housing wall 22a through a casing.

In such a brake, the magnetic flux generated by energization to the coil 29d causes coupling between the amature 29b and brake plate 29c, by the frictional force of which the rotation of the shaft portion 24 is controlled. It will be noted that this brake can be used also as the force retaining device.

Figure 3:
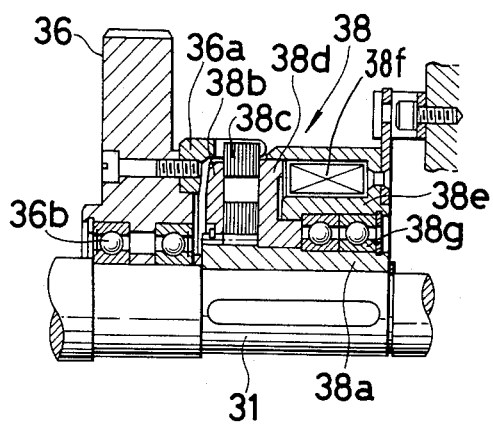
FIG. 3 is a sectional view of a clutch of the same.

FIG. 3 shows an example of a clutch (MWC type Clutch, OGURA CLUTCH CO., LTD.) particularly used for the clutch members 38, 39 of the aforesaid transmission gears 36, 37 and the clutch mechanism 32. This will be described by way of the clutch member 38.

This clutch comprises an inner driver 38a keyed to the transmission shaft 31, an armature 38b fitted in a spline formed in the outer peripheral surface of the inner driver 38a, a clutch plate 38c composed of a plurality of inner and outer plates, a rotor 38d, and a field core 38e adjacent to the rotor 38d, said field core 38e accommodating a coil 38f therein, being fitted in the transmission shaft 31 through a ball bearing 38g and being secured to the housing side so as not to be rotated along with the transmission shaft 31.

The aforesaid transmission gear 36 has a coupling 36a on the side thereof and rotatably mounted on the transmission shaft 31 by means of a ball bearing 36b. Said coupling 36a is connected to the outer plate of the clutch plate 38c and is rotated along with the inner driver 38a by the frictional force generated when the armature 38b, the clutch plate 38c and the rotor 38d are coupled by the magnetic force generated when said coil 38f is energized.

Next, the operation of injection molding will be explained.

First, the clutch mechanism 32 is energized to attract the clutch plate 32c against the clutch member 32a to integrally connect the transmission shafts 30, 31 through the clutch shaft 32b. On the other hand, on the transmission shaft 31 side, the clutch members 38, 39 are deenergized to free the transmission gears 36, 37 from the transmission shaft 31. In the thus prepared condition, the servo-motor 40 is normally run and actuated. This running of the motor causes two transmission shafts 30, 31 to be rotated simultaneously in the same direction, the gear 35 on the transmission shaft 30 side is also rotated. Since the transmission gear 35 is meshed with the gear 17 of the rotary plate 16, the rotary plate 16 also begins to be rotated to urge the threaded shaft 15 together with the movable plate 13 in a mold closing direction, that is, rightwards in FIG. 1. By this movement of the movable plate 13, the molds 14, 14 are closed between the fixed plate 11 and the movable plate 13 and further clamped. This clamping pressure is detected by a current value in the servo-motor 40.

Subsequently, when the clamping pressure reaches a preset value by the bias force of the plunger 15, the force retaining device 42 is started to be energized and the internal brake plate is connected whereby the transmission shaft 30 is secured to the housing side through the clutch shaft 32b and the coupling 42b. By this continuous securing operation, in the clutch mechanism 32, the clutch member 32a is stopped to be energized so that the internal clutch plate is made free to release connection between two transmission shafts 30, 31. As a consequence, the transmission shaft 30 on the side of the clamping mechanism 1 becomes secured when the preset pressure is detected, and various parts connected to the transmission shaft 30 are secured to maintain the clamping pressure.

On the side of the injection mechanism 2, at the same time the clutch member 32a is stopped to be energized, the clutch member 39 is energized, and the internal clutch plate is connected by the magnetic force and the transmission gear 37 is secured to the transmission shaft 31 through the coupling 37a for commencement of the normal rotation.

As the transmission gear 37 rotates, the gear 27 is rotated together with the rotary shaft 24 in the opposite direction, namely, in the counterclockwise direction to deliver the movable member 25 meshed with the threaded shaft 23 leftwards in FIG. 1. Since this movable member 25 has the extended shaft 26 of the injection screw 20 rotatably mounted thereon, the injection screw 20 is also moved leftwards, i.e. forwardly by the movement of the movable member 25, whereby molten resin premetered within the end portion of the injection heating cylinder 21 are charged through the nozzles into the cavities formed by the molds 14, 14.

Upon completion of the charge of the molten resin, the servo-motor 40 also stops. This stoppage of the servo-motor may be readily carried out by employment of electric detection means normally used in the conventional injection molding machine and electric control means actuated by a signal provided when the detection is made.

Almost simultaneously with the stoppage of the servo-motor 40, energization to the clutch member 39 is stopped with the result that the transmission gear 37 is made free and the rotary shaft 24 also stops. Continuous to said stoppage, the other clutch member 38 is energized so that the internal clutch plate 38c is connected to rotate the transmission gear 36 while securing the transmission shaft 31 through the coupling 36a. Upon completion of such a series of clutch operation, the servo-motor 40 is again run. This running direction is reversed to the former, that is, in the counterclockwise direction, whereby the transmission gear 36 is also rotated reversely together with the transmission shaft 31 to rotate the gear 28 clockwise. Since this gear 28 is secured to the extended shaft 26 of the injection screw 20, the injection screw 20 is also rotated clockwise to feed under pressure the resin from a hopper 43 forwardly. This resin is molten and plasticized by the injection heating cylinder 21 and stayed in the extreme end of the injection screw 20. As the molten resin increases, the injection screw 20 is withdrawn by resin pressure while being rotated. Since the injection screw 20 has its rear portion rotatably connected to the movable member 25 through the extended shaft 26, the movable member 25 is moved rightwards in FIG. 1 together with the injection screw 20 and the gear 28 of the extended shaft 26 and the withdrawing force is applied to the movable member 25 and further acting on the threaded shaft 23 to rotate the rotary shaft 24 by the thread lead. At this moment, when the back pressure control device 29 is actuated to impart a predetermined rotational resistance to the rotary shaft 24, screw back pressure is generated thereaft so that plasticization and metering of resin are carried out under the given screw back pressure.

When the movable member 25 is returned to a predetermined position, that is, to an original position, the servo-motor 40 is stopped and the energization to the clutch member 38 is stopped with the result that the transmission gear 36 is made free and the rotation of the injection screw 20 is stopped through the gear 28, and the injection screw 20 will not be withdrawn, thus completing metering. Subsequent to the metering operation, the energization to the force retaining device 42 is stopped with the result that the transmission shaft 30 together with the clutch shaft 32b is made free and at the next time, the clutch member 32a of the clutch mechanism 32 is energized and actuated to connect the transmission shaft 31 and the clutch shaft 32b. Thereby, two transmission shafts 30, 31 are again integrally connected through the clutch shaft 32b to reversely rotate the servo-motor 40 to reversely rotate the transmission shaft 30.

With this re-rotation of the transmission shaft 30, the rotary plate 16 connected through the transmission gear 35 and gear 17 is rotated counterclockwise reversely to the former to move the plunger 15 to the original position by the thread lead. Thereby, the movable plate 13 is also withdrawn along with one mold 14 and mold-opening occurs. When the fact that the movable plate 13 has reached its original position is electrically detected, the servo-motor 40 stops and the injection molding for one cycle terminates.

Examples shown in FIGS. 4 to 12 show those in which the injection mechanism is further specified and the movement of the injection mechanism is made possible by means of a servo-motor (DC type CN-2000 type, SANYO DENKI CO., LTD.).

Figure 12:
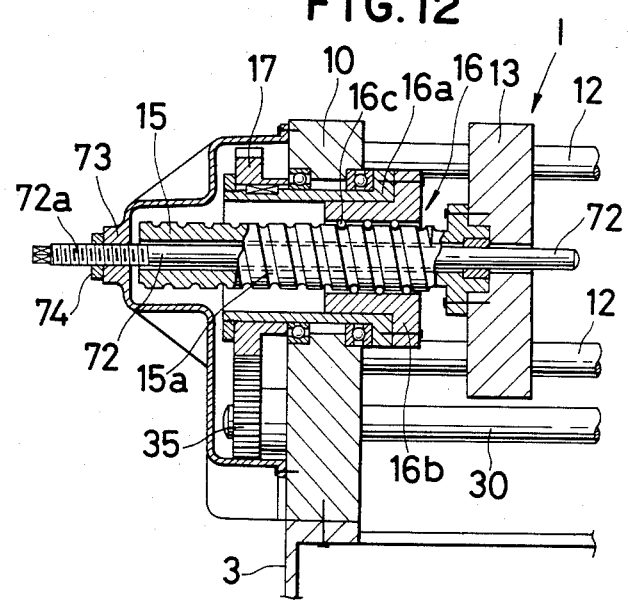
FIG. 12 is a partial longitudinal sectional view of a clamping mechanism showing a knock-out device in accordance with a further embodiment.

Reference is made to FIG. 12 for the specific construction of the clamping mechanism.

Figure 4:
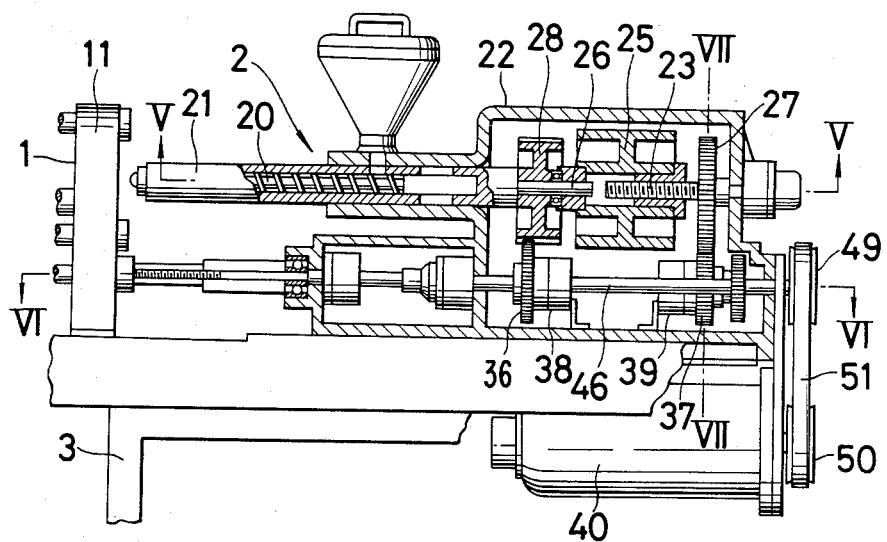
FIG. 4 is a longitudinal sectional view of an injection molding mechanism showing a specific construction of the injection molding machine in accordance with the present invention.
Figure 5:
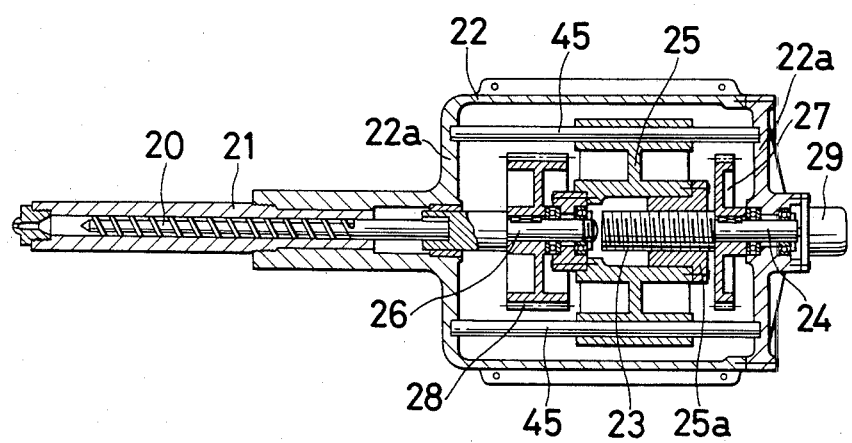
FIG. 5 is a sectional view taken on line V—V of FIG. 4.
Figure 6:
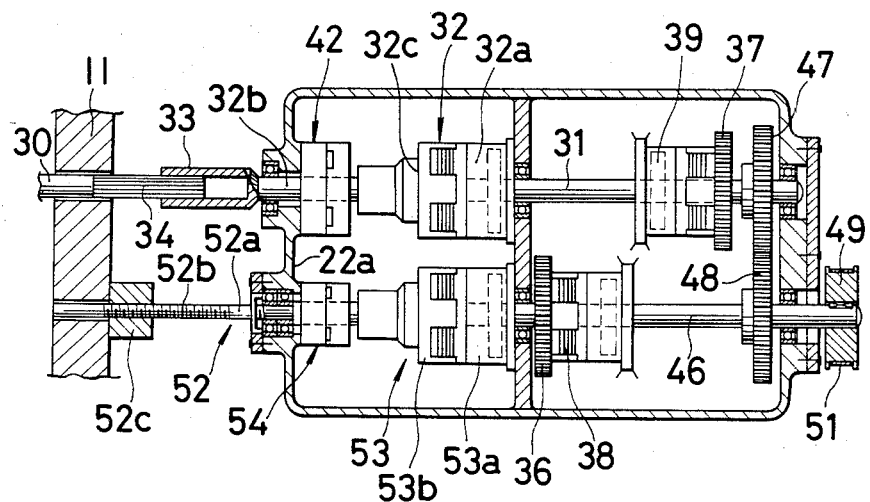
FIG. 6 is a sectional view taken on line VI—VI of FIG. 4.
Figure 7:
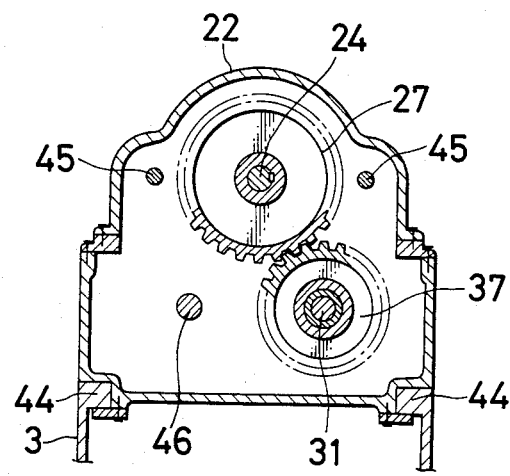
FIG. 7 is a sectional view taken on line VII—VII of FIG. 4.

Parts in this second embodiment of FIG. 4, et seq. similar to those of the above-described first embodiment bear similar reference numerals.

The housing 22 which holds the injection heating cylinder 21 accommodating the injection screw 20 of the injection mechanism 2 therein is disposed movably with respect to the clamping mechanism 1 with both lower sides fitted in the guide rails 44, 44 (FIG. 7) formed on both upper sides of the machine bed 3.

At the upper portion interiorly of the housing 22, the extended shaft 26 provided at the rear end of the injection screw 20 with the gear 28 for rotating the screw is positioned. The end of the extended shaft 26 is rotatably connected to the movable member 25 for advancing the screw. This movable member 25 is retained with both sides thereof slidably inserting through a pair of guide bars 45, 45 (FIG. 5) horizontally mounted over the front and rear walls of the housing 22. The threaded shaft 23 rotatably retained on the housing wall 22a is threadedly connected into the rear portion of the movable member 25 through the thread receiving member 25a, and the gear 27 for advancing the screw is mounted on the shaft portion 24 of the threaded shaft 23. The outer end of the shaft portion of the threaded shaft 23 is communicated with the back pressure control device 29 having a brake secured to the housing wall 22a.

At the lower portion of and within the housing 22, a pair of parallel transmission shafts 31, 46 (FIG. 6) are rotatably provided. The transmission shafts 31, 46 are simultaneously rotated by the meshing of gears 47, 48 respectively mounted thereon. Connected to the outer end of one transmission shaft 46 is the servo-motor 40 mounted on the lower surface of the housing 22. This connection is achieved by passing a driving belt 51 over belt wheels 49, 50 provided on the respective shaft ends, and the transmission shafts 31, 46 are in synchronism with the rotation of the servo-motor 40.

Mounted on the transmission shaft 31 through the clutch member 39 is the transmission gear 37 meshed with the gear 27 for advancing the aforesaid screw, and mounted on the transmission shaft 46 through the clutch member 38 is the transmission gear 36 meshed with the gear 28 for rotating the aforesaid screw.

The inner end of the transmission shaft 31 is connected through the clutch mechanism 32 to be moved towards and away from the transmission shaft 30. The clutch shaft 32b is provided with the joint 33 and the force retaining device 42 in a manner similar to the case of FIG. 1.

On the inner end of the transmission shaft 46 is rotatably supported a nozzle touching mechanism 52 for connecting the fixed plate 11 on the clamping mechanism side with the housing 22, while extending through the housing 22 and being rotatable with respect to the wall 22a.

This nozzle touching mechanism 52 comprises a shaft portion 52a and a threaded shaft 52b meshed with a nut-like thread receiving member 52c mounted on the fixed plate 11, and the clutch mechanism 53 is provided over the shaft portion 52a and the inner end of the transmission shaft 46. This clutch mechanism 53 comprises an electromagnetically-operated clutch member 53a and a coupling 53b connected to the end of the shaft portion 52a, and the transmission shaft 46 and the shaft portion 52a are connected by the excitation of the clutch member 53a to rotate the threaded shaft 52b and move the housing 22 together with the injection mechanism towards the clamping mechanism by the thread lead for accomplishment of nozzle touching.

In the nozzle touching mechanism 52, a nozzle touching force retaining device 54 composed of an electromagnetically-operated brake is disposed over the housing wall 22a and the shaft portion 52a.

Figure 8:
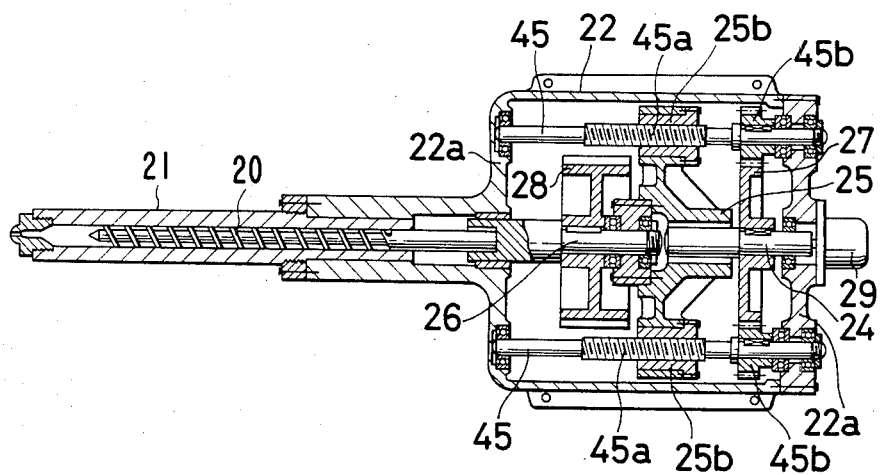
FIG. 8 is a cross sectional view showing another embodiment of a mechanism for rotating and forwardly moving an injection screw.

An example shown in FIG. 8 shows the other moving means for the movable member 25 on the side of the injection mechanism 2. In this embodiment, the movable member 25 is moved by the rotation of the guide bars 45, 45. For this purpose, the guide bars 45, 45 are rotatably mounted on the housing wall portion 22a, a middle portion of which forms the threaded shafts 45a, 45a, and threads are formed also in the inner holes extending through the members 25b, 25b on both ends of the movable member 25 so that said threads are meshed with the threaded shafts 45a, 45a to advance the movable member 25 by the thread lead. The rotation of the guide bars 45, 45 is effected by mounting the gears 45b, 45b meshed with the gear 27 of the shaft portion 24 rotatably projected in the central portion at the rear of the movable member 25.

Next, the operation of the injection mechanism in the aforesaid embodiment will be described in detail.

In the condition wherein the transmission shafts 30, 31 are connected by the clutch mechanism 32 and through the clutch shaft 32b, the servo-motor 40 is normally rotated. On the side of the injection mechanism 2, at this time, the transmission gears 36, 37 are placed in a free condition by the opening operation of the clutch members 38, 39. Also, the clutch mechanism 53 between the transmission shaft 46 and the nozzle touching mechanism 52 is opened to release the connection therebetween. Similarly to the case of FIG. 1, on the side of the clamping mechanism, the rotary plate 16 is rotated by the transmission shaft, and the transmission gear 35 and gear 17 to deliver the plunger 15. As a consequence, the movable plate 13 is moved forward and the molds 14, 14 are closed to effect more powerful clamping. When the clamping pressure reaches a predetermined level, the force retaining device 42 is electromagnetically operated to secure the transmission shaft 30 to the housing side, together with the clutch shaft 32b to stop the rotation of the servo-motor 40. Further, the clutch mechanism 32 is opened to release the connection with the transmission shaft 31. On the side of the injection mechanism, continuous to said operation, the clutch mechanism 53 is closed by a command so that the transmission shaft 46 and the shaft 52a of the nozzle touch mechanism 52 are connected for simultaneous with the threaded shaft 52b by the rotation of the servo-motor 40. With this rotation, the threaded shaft 52b is moved into the fixed plate to pull the housing 22. Since the transmission shaft 30 is axially slidably connected through the coupling 33, the housing 22 is moved towards the fixed plate 11 on the machine bed independently of the transmission shaft 30, where nozzle touching occurs.

When said nozzle touching is assured by a position detector such as a sensor, the nozzle touching force retaining device 54 is operated, rotation of the servo-motor 40 is stopped, the clutch mechanism 53 is opened, and then the clutch member 39 is operated to be closed by a command so that the transmission shaft 31 and the transmission gear 37 are connected and the servo-motor 40 is rotated to rotate the gear 27 for injection together with the threaded shaft 23. This rotation of the threaded shaft 23 causes advancement of the movable member 25 to push the screw 20 for accomplishment of injection.

Upon termination of said injection, the servo-motor 40 stops and at the same time, the clutch member 39 is operated to be opened so that the transmission gear 37 is placed in a free condition with respect to the transmission shaft 31. Also, in the transmission shaft 46, the clutch member 38 is operated to be closed to connect the transmission shaft 46 with the transmission gear 36. When the servo-motor 40 is reversely rotated by a command, the gear 28 for rotating the screw is rotated together with the extended shaft 26 by the transmission gear 36, and the screw 20 is rotated therewith to start charging the material. At this time, the back pressure control device 29 is actuated to generate screw back pressure. A material from the hopper is molten and fed under pressure to the extreme end of the screw by rotation of the screw 20, by pressure of which the screw 20 is withdrawn together with the movable member 25. This withdrawal is electrically assured, and when metering of material is completed, the servo-motor 40 temporarily stops when the servo-motor 40 is again reversely rotated after the nozzle touching force retaining device 54 is opened and the clutch mechanism 53 is closed, the threaded shaft 52b is also reversely rotated to force the housing 22 to return to its original position to release nozzle touching. This assurance is effected by a sensor. Thus, one cycle of the injection molding process is finished. Then various parts are changed over for next injection process.

The output of an electric current flowing into the servo-motor 40 at the time of said clamping and injection can be detected by the device shown in FIG. 9, and controlling may be carried out by said output detection. In this device, a speed setter 57 and a torque setter 58 are provided in parallel between a concentrated control device 53 and a motor controlled amplifier 56 having a servo-motor 40 and a tachometer generator 41 connected thereto. An electric current setter 61 is connected through a comparator 60 to a current detector 59 provided in the circuit of the servo-motor 40, said comparator 60 being connected to the aforesaid concentrated control device 55.

Connected to the concentrated control device 55 are said clutch mechanism 32, the clamping force retaining device 42, the position detector 62, the operating switch 63 and the back pressure control amplifier 64 of said back pressure control device 29.

Next, the detection of the force in retaining the clamping force will be described.

In the condition wherein the transmission shafts 30, 31 are connected through the clutch shaft 32b and by the clutch mechanism 32, the servo-motor 40 is normally rotated.

When the movable plate 13 is moved and the molds 14, 14 are closed, a great torque occurs and an electric current increases. At this time, the current setter 61 with a torque adjusted to the required torque is compared with the detection current in the current detector 59 by the comparator, and if a coincided confirmation signal occurs, the clamping force retaining device 42 is excited by the concentrated control device 55, and the transmission shaft 30 is secured to the housing side. By this securement of the transmission shaft 30, the movable plate 13 maintains the clamping condition.

Also, the clamping force retaining device 42 is excited and thereafter the clutch mechanism 32 is electrically opened to release the connection with the transmission shaft 31. And the turning force by the servo-motor 40 is used for nozzle touching and injection.

The description has been made in the aforementioned embodiment of the case where the clamping force in the injection molding machine is detected, but it is also possible to use similar means to detect and control the nozzle touching force, injection pressure and screw turning force.

Figure 11:
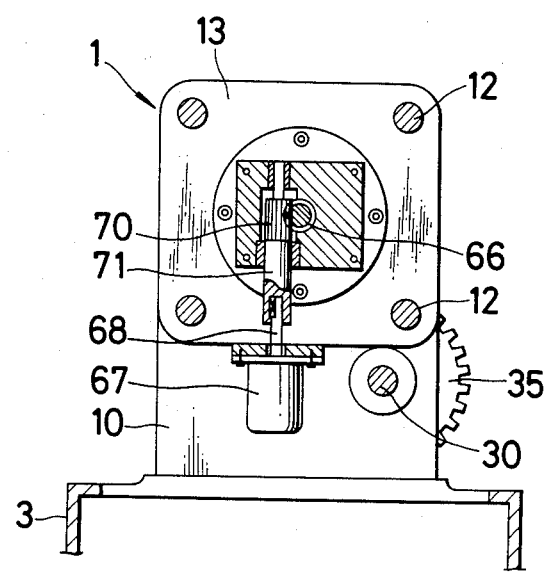
FIG. 11 is a sectional view taken on line XI—XI of the same.

FIGS. 10 and 11 show a molded article knock-out device by the motor. This knock-out device comprises a knock-out pin 66 extending through a connecting member 65 of the plunger 15 provided on the back of the movable plate 13, a rotary and driving device 67 mounted on the lower end of the movable plate 13, and a rotary shaft 68. The rotary plate 16 is rotatably mounted on the fixed plate 10 by means of the ball bearing and the plunger 15 is threaded into the thread receiving member 16b secured within the rotary plate.

The aforesaid rotary and driving device 67, which comprises an electric motor and a speed change and reduction unit, is provided to suitably speed change or reduce the rotation of the electric motor depending on molded articles and transmit said rotation to the rotary shaft 68, by which said knock-out pin 66 is moved forward and backward.

The rotary shaft 68 and the knock-out pin 66 are associated by the gear means. In the illustrated embodiment, a rack 69 is provided on the side at the rear of the knock-out pin 66, and a shaft 71 with a pinion 70 is associated with the rotary shaft 68 so that the knock-out pin is moved forward and backward by said rack 69 and said pinion 70 meshed with each other.

FIG. 12 shows the clamping mechanism 1 and the knock-out device in a further embodimemt. The rotary plate 16 of the clamping mechanism 1 comprises a rotary cylinder 16a rotatably extended through the fixed plate 10 and held by means of a bearing and a screw receiving member 16b fitted in the inner end of the rotary cylinder 16a, and on the outer end of the rotary member is mounted a gear 17 meshed with the gear 35 of the aforesaid transmission shaft 30. The screw receiving member 16b is internally provided with a number of balls 16c meshed with the ball type thread 15a in the peripheral side of said plunger 15. In the aforementioned knock-out device, a knock-out rod 72 extends through a hole bored from the plunger 15 to the movable plate 13. The rear end of the knock-out rod 72 is attached to the fixed plate 10 and is connected through a nut 74 in the middle of a receiving member 73 which also serves as a cover provided between said rear end and the outer end of the plunger 15 leaving a required spacing, whereby it assumes a fixed condition with respect to the movable plate 13 and the plunger 15. Accordingly, the extreme end of the knock-out rod 72 is projected from the movable plate 13 every mold opening. The amount of projection of the knock-out rod 72 from the movable plate 13 can be suitably adjusted by a threaded shaft 72a and a nut 74 at the rear end of the knock-out rod.

While in the above-described embodiments, the servo-motor 40 is connected to the transmission shaft on the side of the injection mechanism 2, it should be noted that the mounting position thereof can be on the side of the clamping mechanism 1, in which case, the motor is connected to the transmission shaft 30. Thus, the mounting position of the servo-motor is not particularly limited.

POSSIBILITY OF INDUSTRIAL UTILIZATION

As described hereinbefore, the injection molding machine in accordance with the present invention is useful as a molding machine for synthetic resins without using a hydraulic device at all, and may be applied as an optimal molding machine which can overcome the instability given to the molding machine resulting from a variation in viscosity of hydraulic oil particularly in the case the oil pressure is used as a power, and which is higher in power transmission efficiency than that of the machine using oil pressure thus saving the electric power.

What is claimed is:

1. An injection molding machine for synthetic resins, including
    a clamping mechanism which comprises a machine bed, a fixed plate provided on said machine bed, a movable plate disposed to be moved toward and away from said fixed plate and a guide member for guiding said movable plate toward and away from said fixed plate; molds mounted on opposed surfaces of and between said fixed plate and said movable plate, a clamping plunger connected to said movable plate and extending from said movable plate away from said fixed plate and said plunger being formed with threads in the periphery thereof, a rotary member internally threadedly engaged with said threaded plunger for moving said plunger in an axial direction as said rotary member rotates; and a fixed member fixed with respect to said machine bed and located at the rear of said movable plate away from said fixed plate for retaining said rotary member; and
    an injection mechanism which comprises a housing near to said clamping mechanism and on said machine bed, and an injection heating cylinder mounted and positioned on the side of said housing facing toward said clamping mechanism, said injection molding machine further comprising transmission means comprising transmission means shaft extending past said clamping mechanism and said injection mechanism, and first gear means rotatably connected with said transmission means shaft in said clamping mechanism for transmitting rotation of said first gear means caused by said transmission shaft means to said rotary member,
    an injection screw advanceable through said injection heating cylinder, and also rotatable in said injection heating cylinder for being rotated to advance material through that said cylinder, a rotary shaft for rotating said injection screw and a second gear for rotating said rotary shaft; means for rotating said injection screw by said rotary shaft through said second gear and these means being provided within said housing, said transmission means shaft in said housing supporting a third gear meshed with said second gear of said means for advancing and rotating said injection screw,
    a first electromagnetically-operated clutch mechanism for selectively connecting said transmission means shaft with said third gear, an electric servo-motor as a driving source for driving said transmission means shaft to rotate, a second electromagnetically-operated clutch mechanism disengageable for temporarily stopping and engageable for thereafter starting the application of a turning force of said servo-motor to said clamping mechanism first gear, and a force retaining device comprising an electromagnetically-operated brake for retaining a clamping force on said clamping gear during said temporary stoppage.

2. An injection molding machine according to claim 1, wherein said injection mechanism housing is fixed to said bed, said means for advancing and rotating said injection screw comprises the first mentioned said rotary shaft located at the rear of said injection screw at the side thereof away from said clamping mechanism, a member movably provided over first rotary shaft at the rear of said injection screw, a second rotary shaft in said housing parallel to said first rotary shaft, said second rotary shaft having a threaded portion within said housing, said third gear for rotating said injection screw being fixedly mounted on said first rotary shaft, and a fourth gear connected with said injection screw for advancing said injection screw, said fourth gear being fixedly mounted on said second rotary shaft, third electromagnetically-operated clutch mechanism connected with said transmission shaft means and with said fourth gear for being engaged to connect rotation of said transmission means shaft to said fourth gear.

3. An injection molding machine according to claim 1, further comprising a back pressure control device which comprises an electromagnetic brake provided on said rotary shaft of said means for rotating said injection screw for controlling the rotation of said injection screw through said rotary shaft and for applying back pressure when said injection screw is moved backward.

4. An injection molding machine according to claim 1, wherein said transmission means shaft comprises two transmission shafts disposed on the clamping mechanism side and the injection mechanism side, respectively, said transmission shafts being connected through a third clutch mechanism, including a clutch shaft and a joint at the end of said clutch shaft for allowing axial movement of said transmission shafts with respect to each other.

5. An injection molding machine according to claim 1, wherein said servo-motor is secured to said housing and is connected to said transmission shaft means on said injection mechanism side.

6. An injection molding machine according to claim 4, wherein said injection mechanism housing is movable with respect to said bed, said transmission means shaft on said injection mechanism side comprises a third transmission shaft provided in parallel to the other first two said transmission shafts and disposed within said housing, the first two and the third said transmission shafts being connected to each other by gear means, said third transmission shaft being connected through a fourth electromagnetically-operated clutch mechanism to a nozzle touching mechanism, said nozzle touching mechanism comprising a shaft having a threaded portion threadedly engaged with a thread receiving member on the side of said clamping mechanism and said force retaining device being provided at said housing side.

7. An injection molding machine according to claim 1, comprising an output detection control device which comprises a concentrated control device to which are connected a third clutch mechanism which is disposed between said transmission means shaft on said clamping mechanism side and said transmission means shaft on said injection mechanism side, a force retaining device on said clamping mechanism side, a nozzle position detector and a back pressure control device, a motor control amplifier to which are connected said servo-motor and a tachometer generator; a speed setter and a torque setter provided in parallel between said concentrated control device and said motor control amplifier; and an electric current setter connected through a comparator connected to said concentrated control device to an electric current detector provided in a circuit of said servo-motor.

8. An injection molding machine according to claim 1, further comprising a fourth gear supported on said transmission means shaft, fifth gear means drivingly connected with said fourth gear to be moved thereby and to said injection screw for driving said injection screw to advance and retract, third electromagnetically-operated clutch means for selectively connecting said transmission means shaft with said fourth gear for rotating said fourth gear.

* * * * *